United States Patent
Liu et al.

(10) Patent No.: US 8,328,911 B2
(45) Date of Patent: Dec. 11, 2012

(54) METHOD FOR REMOVING $CO_2$ FROM COAL-FIRED POWER PLANT FLUE GAS USING AMMONIA AS THE SCRUBBING SOLUTION, WITH A CHEMICAL ADDITIVE FOR REDUCING $NH_3$ LOSSES, COUPLED WITH A MEMBRANE FOR CONCENTRATING THE $CO_2$ STREAM TO THE GAS STRIPPER

(75) Inventors: Kunlei Liu, Lexington, KY (US); James K. Neathery, Lexington, KY (US); Joseph E. Remias, Lexington, KY (US); Xiansen Li, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 201 days.

(21) Appl. No.: 12/819,626

(22) Filed: Jun. 21, 2010

(65) Prior Publication Data

US 2011/0311429 A1 Dec. 22, 2011

(51) Int. Cl.
*B01D 53/14* (2006.01)

(52) U.S. Cl. .................. 95/183; 95/51; 95/211; 95/236; 96/6; 96/235; 96/242; 96/290; 423/220

(58) Field of Classification Search .......................... None
See application file for complete search history.

(56) References Cited

U.S. PATENT DOCUMENTS

| | | | |
|---|---|---|---|
| 1,897,725 A | 2/1933 | Gaus et al. | |
| 2,799,851 A * | 7/1957 | Moore | 261/129 |
| 2,930,672 A * | 3/1960 | Morris | 423/246 |
| 4,130,403 A | 12/1978 | Cooley et al. | |
| 4,775,396 A | 10/1988 | Rastelli et al. | |
| 5,832,712 A | 11/1998 | Ronning et al. | |
| 5,925,326 A | 7/1999 | Kapoor et al. | |
| 6,380,276 B1 | 4/2002 | Borovik et al. | |
| 6,432,169 B1 * | 8/2002 | Kluwe et al. | 95/52 |
| 6,565,626 B1 | 5/2003 | Baker et al. | |
| 6,572,678 B1 | 6/2003 | Wijmans et al. | |
| 2004/0170935 A1 | 9/2004 | Lebas et al. | |
| 2005/0284290 A1 * | 12/2005 | Pruet | 95/52 |
| 2007/0031302 A1 * | 2/2007 | Wittrup et al. | 422/168 |
| 2008/0276803 A1 | 11/2008 | Molaison et al. | |
| 2009/0007780 A1 * | 1/2009 | Yajima et al. | 95/52 |
| 2009/0155889 A1 * | 6/2009 | Handagama et al. | 435/262.5 |
| 2010/0229720 A1 * | 9/2010 | Sonwane et al. | 95/46 |
| 2011/0052453 A1 * | 3/2011 | McLarnon et al. | 422/170 |
| 2011/0100216 A1 * | 5/2011 | Kozak et al. | 95/168 |
| 2011/0120308 A1 * | 5/2011 | Dube et al. | 95/199 |

FOREIGN PATENT DOCUMENTS

CA 2678800 A1 8/2008
(Continued)

*Primary Examiner* — Duane Smith
*Assistant Examiner* — Pankti Patel
(74) *Attorney, Agent, or Firm* — King & Schickli, PLLC

(57) ABSTRACT

A method for removing and capturing carbon dioxide from a fluid stream includes the steps of exposing the fluid stream to an aqueous scrubbing solution that removes and holds carbon dioxide from the fluid stream, passing the aqueous scrubbing solution through a membrane in order to separate excess water from the scrubbing solution and increase the concentration of carbon dioxide in the scrubbing solution, heating the scrubbing solution having an increased concentration of carbon dioxide so as to release carbon dioxide gas and recycling the scrubbing solution. A carbon dioxide capture apparatus includes a carbon dioxide scrubber, a membrane downstream from the scrubber for separating water and concentrating carbon dioxide in a scrubbing solution and a stripper vessel.

11 Claims, 2 Drawing Sheets

FOREIGN PATENT DOCUMENTS

| | | |
|---|---|---|
| EP | 1 039 115 A2 | 9/2000 |
| GB | 899611 A | 6/1962 |
| WO | WO 2008/090166 A1 | 7/2008 |
| WO | WO 2008/090167 A1 | 7/2008 |
| WO | WO 2009/009725 A1 | 1/2009 |

* cited by examiner

METHOD FOR REMOVING CO₂ FROM COAL-FIRED POWER PLANT FLUE GAS USING AMMONIA AS THE SCRUBBING SOLUTION, WITH A CHEMICAL ADDITIVE FOR REDUCING NH₃ LOSSES, COUPLED WITH A MEMBRANE FOR CONCENTRATING THE CO₂ STREAM TO THE GAS STRIPPER

TECHNICAL FIELD AND INDUSTRIAL APPLICABILITY OF THE INVENTION

The present invention relates generally to the separation of carbon dioxide from a fluid or process stream and, more particularly, to an apparatus and method for removing and capturing carbon dioxide from a flue gas stream.

BACKGROUND OF THE INVENTION

At present, the energy sector is responsible for about three-fourths of the anthropogenic carbon dioxide emissions. Over the past 15 years, economic activity in the U.S. has increased by about 50%; total U.S. electricity demand has increased 30% over the same period. In the coming years, the surge in the U.S. demand for electric power shows no signs of abating. Economic activity in the U.S. is projected to expand 49% by 2020. Accordingly, in the same period, the demand for electricity is projected to increase by another 30%. With this increase in electricity demand, $CO_2$ emissions from more and more power plants will become an even greater driving force in rising atmospheric temperatures.

Capturing and storing carbon dioxide could slow down climate change and also allow fossil fuels to be a bridge to a clean, renewable energy future. Since the $CO_2$ emitted from electric utilities is the present concern, faster implementation of $CO_2$ capture by chemical means at stationary combustion sources would be highly desirable. While absorption/stripping with amine-based scrubber systems has been successfully used for natural-gas purification, it poses several technical challenges, including the fact that flue gas from utility boilers is at atmospheric pressure and the concentration of $CO_2$ in the flue gas is relatively low at 12-14%. Another technical hurdle is the energy requirements for the $CO_2$ capture/desorption devices to regenerate absorber reagents.

In a typical coal-fired power plant, coal is burned in a boiler to make high temperature and high pressure steam which will drive a steam turbine and generate electricity for power production. After the coal is burned, the gases that are the products of the combustion reaction leave the boiler and are then treated in a NO removal device called a Selective Catalytic Reduction (SCR). After the SCR, the gas is further treated in the Electrostatic Precipitator (ESP) to remove particulate matter. After this, the gas will travel through the $SO_2$ removal device ($SO_2$ scrubber). The next step of the process involves the removal and capture of carbon dioxide and it is this step that is the subject of the present invention.

In accordance with the present invention, an ammonia based solution is used to scrub the flue gas and a membrane is used for purpose of solvent enrichment. Advantageously, the present invention provides a number of benefits that other carbon dioxide capture processes do not possess. First, with the currently available $CO_2$ capture processes, the energy needed to run these processes at coal-fired power plants is very high. Current $CO_2$ capture processes use a monoethanolamine (MEA) solution or other amine-based absorbent solvent solutions. It is estimated that with the current $CO_2$ capture processes, if they were applied to coal-fired flue gas, the cost of electricity would increase by 60-70%. The present invention, using an ammonia solution, will increase the cost of electricity by less than 30%.

Ammonia solutions have been experimented with for years in $CO_2$ capture processes, but ammonia's high vapor pressure is the one glaring negative. Herein lies the second benefit of the present invention. The present invention utilizes a chemical additive that reduces $NH_3$ losses by 80%. This additive also increases the solution reactivity, and reaction kinetics is one of the limiting mechanisms when using $NH_3$ based capture solutions.

The third benefit of the present invention leads to an even smaller increase in electricity costs, compared to amine-based processes. In the present invention process, a membrane is used to reduce the amount of aqueous ammonia and liquid water that is sent to the gas stripper. This lowers the energy penalty even further.

SUMMARY OF THE INVENTION

In accordance with the purposes of the present invention as described herein, a method is provided for removing and capturing carbon dioxide from a fluid stream such as a flue gas stream. The method comprises the steps of (a) exposing the fluid stream to an aqueous scrubbing solution that removes and holds carbon dioxide from the fluid stream, (b) passing the aqueous scrubbing solution through a membrane in order to separate excess water from the scrubbing solution and increase the concentration of carbon dioxide in the scrubbing stream, (c) heating the scrubbing solution, having an increased concentration of carbon dioxide, so as to release carbon dioxide gas and (d) recycling the scrubbing solution.

More specifically describing the invention, the aqueous scrubbing solution comprises between about 7 and about 15 weight percent ammonia. Further, a transition metal catalyst capable of forming a metal ammonia complex is provided in the scrubbing solution. That catalyst is a metal ion selected from a group of transition metal ion catalysts consisting of zinc, nickel, copper, cobalt and mixtures thereof.

The method further includes using a zeolite membrane to increase the concentration of carbon dioxide in the scrubbing solution. The zeolite used in the membrane is selected from a group consisting of mordenite zeolite, phillipsite zeolite, erionite zeolite, offretite zeolite, erionite and offretite intergrowth zeolite, faujasite zeolite, chabazite zeolite and mixtures thereof.

In accordance with yet another aspect of the present invention a carbon dioxide capture apparatus is provided. That carbon dioxide capture apparatus comprises a carbon dioxide scrubber having (a) a first inlet receiving a fluid stream having a first concentration of carbon dioxide, (b) a second inlet receiving a scrubbing solution having a relatively low concentration of carbon dioxide, (c) a first outlet discharging said fluid stream now having a second concentration of carbon dioxide wherein said second concentration of carbon dioxide is lower than said first concentration of carbon dioxide and (d) a second outlet discharging said scrubbing solution now having a relatively high concentration of carbon dioxide. Further, the apparatus includes a membrane downstream from the second outlet. The scrubbing solution discharged from the second outlet passes through that membrane which separates water from, and concentrates the carbon dioxide in the scrubbing solution. In addition, the apparatus includes a stripper vessel. The stripper vessel has (a) a first inlet port receiving said scrubbing solution from said membrane, (b) a heating apparatus heating said scrubbing solution in said stripper vessel so as to generate water vapor and carbon dioxide gas from said scrubbing solution, (c) a first outlet port discharging said water vapor and carbon dioxide gas removed from said scrubbing solution and (d) a second outlet port discharging said scrubbing solution now having a relatively low concentration of carbon dioxide.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

DETAILED DESCRIPTION OF THE INVENTION

Figure 1A:
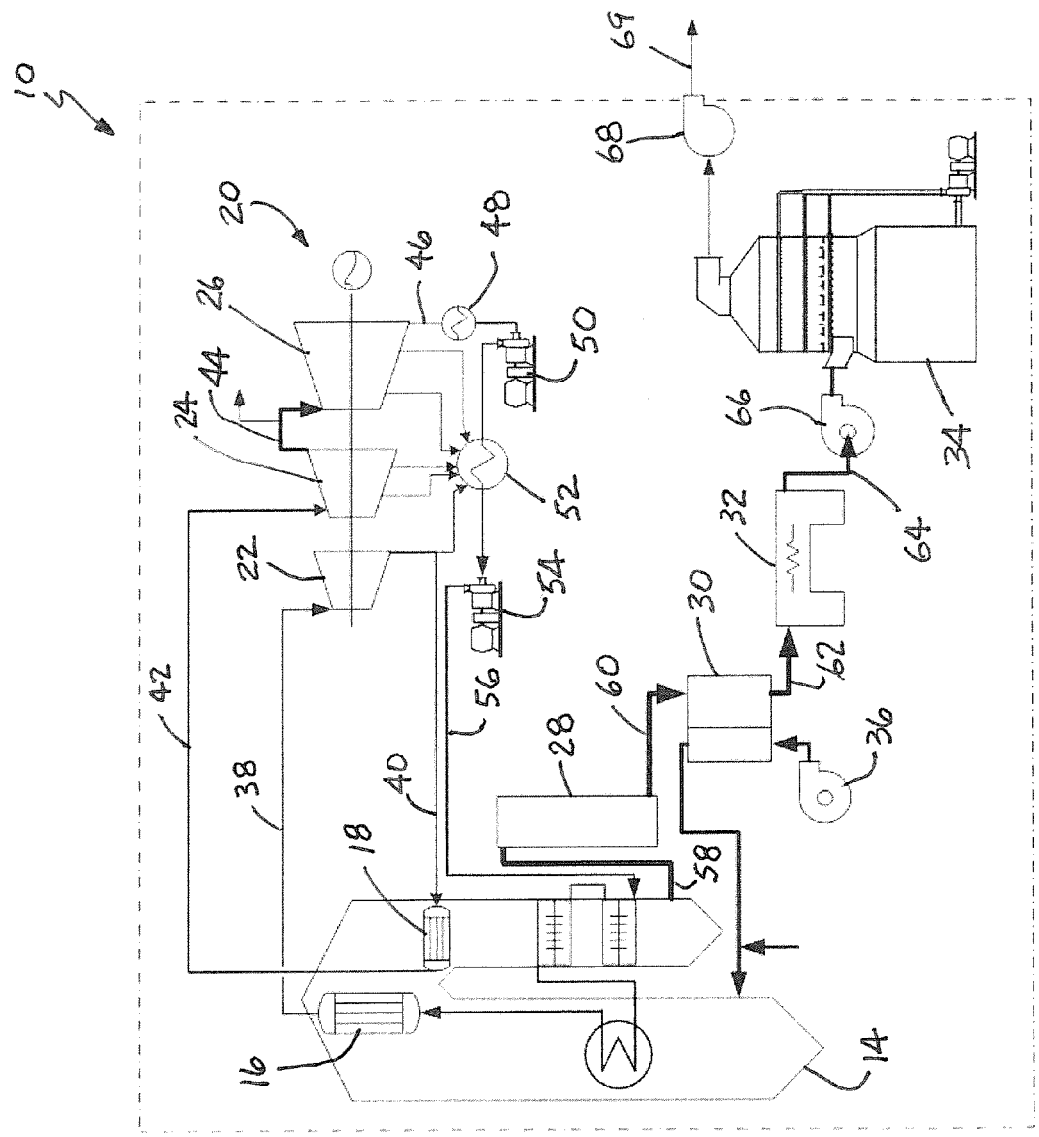
FIGS. 1a and 1b are schematical flow sheets illustrating a coal fired power plant equipped with the carbon dioxide capture apparatus of the present invention; and Reference will now be made in detail to the present preferred embodiment of the invention, examples of which are illustrated in the accompanying drawings.
Figure 1B:
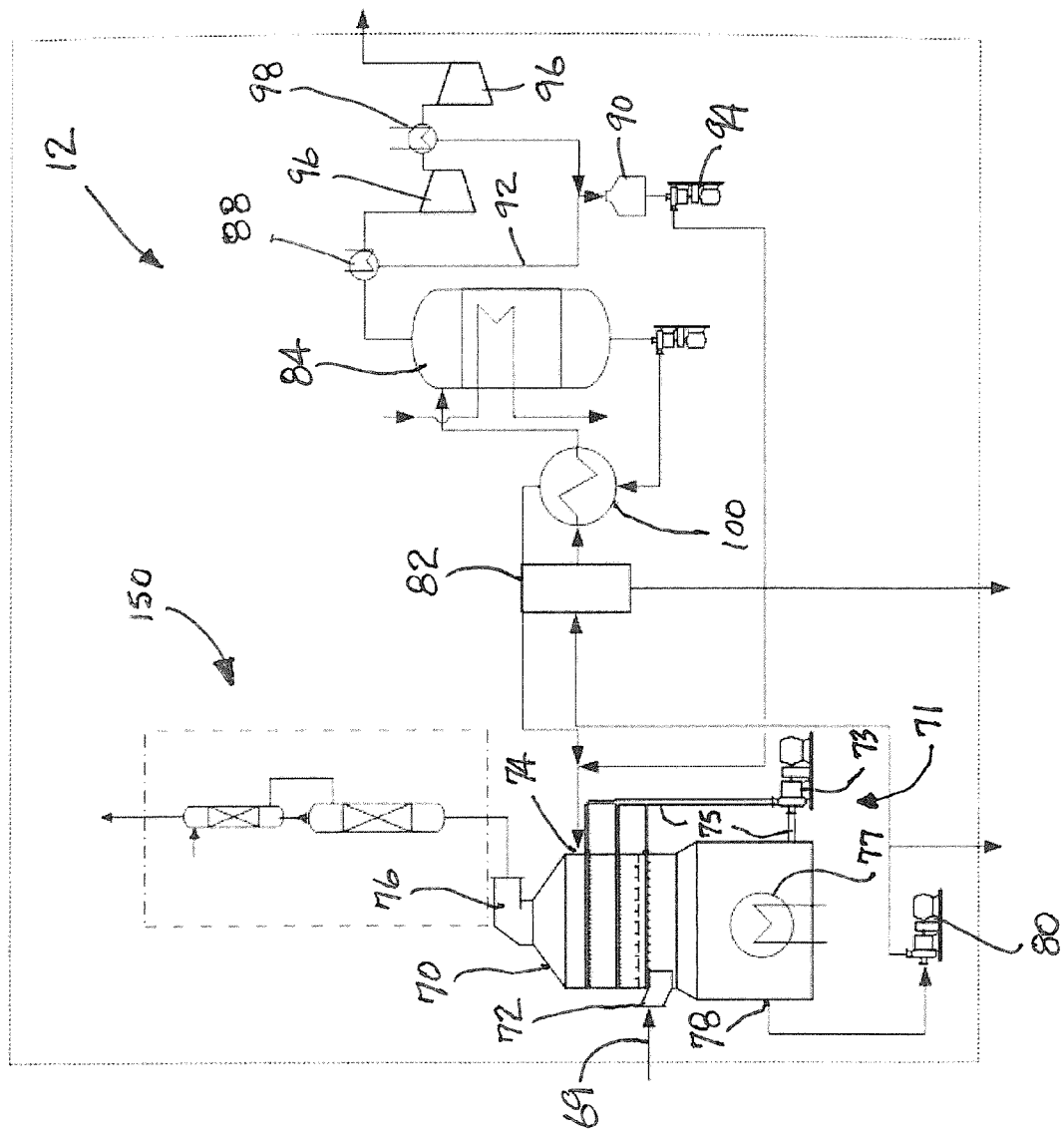

Reference is now made to FIGS. 1a and 1b illustrating a coal fired power plant 10 equipped with the carbon dioxide capture apparatus 12 of the present invention. The coal fired power plant 10 includes a boiler 14 having a super heater 16 and re-heater 18 (see FIG. 1a). The coal fired power plant 10 also includes an electric generator, generally designated by reference numeral 20, including a high pressure turbine 22, an intermediate pressure turbine 24 and a low pressure turbine 26. In addition the coal fired power plant 10 includes a selective catalytic reduction unit (SCR) 28, a combustion air pre-heater (APH) 30, an electrostatic precipitator (ESP) 32 and a sulfur dioxide scrubber 34.

Combustion air is delivered by the forced draft fan 36 to the combustion air pre-heater 30 where that combustion air is preheated by the fluid stream being exhausted from the SCR 28. The combustion air is then mixed with fuel, such as coal from a stock pile, and delivered to the boiler 14 where it is combusted to generate steam for running the turbines 22, 24, 26 of the electric generator 20.

More specifically, the water delivered to the boiler is converted to high temperature and high pressure steam which passes through the super heater 16 and then through the line 38 to the high pressure turbine 22. After passing through the high pressure turbine 22, the remaining steam is recycled through the line 40 to the re-heater 18. The reheated steam then passes through the line 42 to the intermediate pressure turbine 24. Any steam remaining then passes through the line 44 to the low pressure turbine 26. Spent steam from the low pressure turbine 26 is then directed through the line 46 to a condenser 48. The liquid water is then moved by pump 50 through feed water heaters 52 which receive some high temperature steam from each of the turbines 22, 24, 26 to provide preheating of the water supply. A pump 54 receives the heated feed water from the feed water heaters 52 and recycles that feed water back to the boiler 14 for steam generation through the line 56.

At the same time, the gasses that are the product of the combustion reaction in the boiler leave the boiler fuel line 58 and are delivered to the SCR 28. As is known in the art, the SCR 28 removes NO from the flue gas stream. The flue gas stream then exits the SCR 28 through the line 60, passes through the APH 30 to preheat the combustion air and then travels through line 62 to the ESP 32. As is known in the art the ESP removes particulate matter from the flue gas stream.

Next the flue gas stream exits the ESP 32 and travels along line 64 to an induced draft fan 66 which then moves the flue gas into the $SO_2$ scrubber 34. The scrubber 34 removes sulfur dioxide from the flue gas stream in a manner known in the art. The flue gas stream is then delivered by the fan 68 to the carbon dioxide capture apparatus 12 of the present invention through the line 69 that bridges drawing FIGS. 1a and 1b.

The carbon dioxide capture apparatus 12 includes a carbon dioxide scrubber 70 (see FIG. 1b). The carbon dioxide scrubber 70 has a first inlet 72 for receiving the fluid or flue gas stream from the fan 68 and a second inlet 74 for receiving a scrubbing solution. More specifically, the fluid or flue gas stream entering the first inlet 72 has a first concentration of carbon dioxide while the scrubbing solution has a second, relatively low concentration of carbon dioxide. The flue gas stream enters the scrubber 70 so that it is contacted in a counter-current manner with the scrubbing solution which is continually recycled from the bottom of the scrubber 70 by the recycling circuit 71 including the pump 73 and lines 75. A cooler 77 in the bottom of the scrubber 70 cools the scrubbing solution to further enhance the carbon dioxide scrubbing action. The carbon dioxide is removed from the flue gas by the scrubbing solution and enters the liquid phase where the carbon dioxide is converted to bicarbonate, carbonate and carbomate.

The scrubber 70 also includes a first outlet 76 at the top of the scrubber for discharging the fluid or flue gas stream now having a second concentration of carbon dioxide which is lower than the first concentration it had upon entering the scrubber. In addition, the apparatus 70 includes a second outlet 78 at the bottom thereof for discharging the scrubbing solution now having a relatively high concentration of carbon dioxide.

The flue gas stream passing through the outlet 76 next passes through an ammonia emission control block 150 before being exhausted into the environment through an exhaust stack. The ammonia emission control block 150 includes an ammonia-free water scrubber to remove fugitive ammonia and a bioreactor unit to recover water to be recycled for reuse inside the ammonia recovery process.

The transition metal-based ion catalyst acts as a chelating agent that reacts with free ammonia in the scrubbing solution, thereby binding with ammonia and not allowing it to vaporize and leave the system. The chelated compound that forms with the transition metal-based ion catalyst is actually a species that is in equilibrium with the free ammonia in the system. As unchelated free ammonia reacts with carbon dioxide to form ammonium bicarbonate (aq), ammonia is released from the chelated compound, and is free for capturing more carbon dioxide.

The scrubbing solution utilized in the apparatus 12 comprises an aqueous solution of between about 7 and about 15 weight percent, and more preferably about 10 weight percent, ammonia. Further, the scrubbing solution includes a transition metal catalyst capable of forming a metal ammonia complex in the scrubbing solution. Specifically, that transition metal catalyst is an ion of a transition metal selected from a group consisting of zinc, nickel, copper, cobalt and mixtures thereof. The transition metal ion catalyst is provided at a concentration of between about 0.1 and about 2.0 weight percent. Substantially, any salt of the transition metal may be dissolved in the scrubbing solution to provide the transition metal ion catalyst. Such salts include, but are in no way limited to, zinc hydroxide, nickel hydroxide, copper hydroxide, cobalt hydroxide, zinc nitrate, copper chloride, and cobalt carbonate.

Advantageously, the transition metal catalyst reduces ammonia losses by about 80%. The additive also increases the solution reactivity so as to enhance reaction kinetics. The scrubbing solution exiting the second outlet 78 now has a relatively high concentration of carbon dioxide. That scrubbing solution is moved by the pump 80 through a membrane 82 before being delivered to a stripper vessel 84.

The membrane 82 has a high rejection rate for carbon species and functions to reduce the amount of aqueous ammonia and liquid water that is sent to the stripper vessel 84 while simultaneously increasing the concentration of the carbon (e.g., $CO_3^{2-}$ and $HCO_3^-$ was) in the portion of the scrubbing solution that is delivered to the stripper vessel for regeneration. As a result, less water needs to be brought up to the stripping temperature and the energy required for stripping is reduced. Thus, the membrane 82 substantially lowers the energy penalty for removing the carbon dioxide and regenerating the scrubbing solution. The membrane 82 utilized may be a zeolite membrane where the zeolite is selected from a group consisting of mordenite zeolite, phillipsite zeolite, erionite zeolite, offretite zeolite, erionite and offretite intergrowth zeolite, faujasite zeolite, chabazite zeolite and mixtures thereof. The zeolite membrane 82 allows water and ammonium hydroxide components of the scrubbing solution to permeate through the membrane due to the strong hydrophilicity and inherent NF nature of zeolite membranes. This leads to increased rejection rate for total carbon and increased pH in the permeate relative to the feed. Advantageously, the increased pH values of between about 9.0 and about 10.5 allow for more efficient processing and removal of carbon dioxide from the flue gas.

The portion of the scrubbing solution delivered to the stripper vessel 84 is subjected to heating which may, for example, be provided by circulating steam discharged from a low pressure turbine 26 through a heat exchanger in the vessel 84. As a result of the heating, a gas stream of now over perhaps 90% carbon dioxide exits the stripper vessel 84 through the line 86. That gas stream then passes through the cooler 88 to condense any remaining ammonia and water which are delivered to a tank 90 through the line 92. A pump 94 then returns the recovered water and ammonia to the carbon dioxide scrubber 70 to continue the process. In contrast, the concentrated carbon dioxide exiting the cooler 88 is subjected to compression in compressors 96 and then delivered to a storage or utilization site. A heat exchanger 98 between the compressors 96 allows heat recovery in order to increase the efficiency of the overall energy generation process.

While only one stripper vessel 84 is illustrated in the drawing figures, it should be appreciated that the apparatus 12 is preferably provided with multiple stripper vessels so that while one or more stripper vessels 84 are being utilized to process the fluid stream exiting the membrane 82 other stripper vessels are being utilized to recycle scrubbing solution from the stripper vessel to the carbon dioxide scrubber 70. The valve 100 associated with each stripper vessel 84 may be used to select between the processing and scrubbing solution return cycles.

The scrubbing solution delivered to the carbon dioxide scrubber 70 through the second inlet 74 is a lean solution including about 0.077 kg of carbon dioxide/kg solvent while the scrubbing solution delivered to the stripper vessel 84 is a rich solution having an increased concentration of carbon dioxide including about 0.177 kg of carbon dioxide/kg solvent.

In accordance with an additional aspect of the invention, it should be appreciated that a method is provided for removing and capturing carbon dioxide from a fluid stream. That method comprises exposing the fluid stream to an aqueous scrubbing solution that removes and holds carbon dioxide from the fluid stream. In addition, the method includes passing the aqueous scrubbing solution through a membrane in order to separate excess water from the scrubbing solution and increase the concentration of carbon dioxide in the scrubbing solution. Further, the method includes heating the scrubbing solution now having an increased concentration of carbon dioxide so as to release carbon dioxide gas. This is followed by the step of recycling the scrubbing solution.

The following examples are presented to further illustrate the invention, but it is not to be considered as limited thereto.

EXAMPLE 1

FAU zeolite membranes were hydrothermally grown onto tubular mullite supports (so far in our lab, 1.2 cm diameter and 10-cm-ong from Masuda Corporation, the diameter and length could be varied for commercial application), yielding membranes with a total surface area of 37.68 $cm^2$ (will depend on the dimension of support selected). Before synthesis, the outer surface of the mullite tube was seeded with a water slurry of commercially available NaY crystal seeds. The seeded support was then air dried at 80° C. for several hours. The desired gel composition was optimized to grow an FAU zeolite membrane layer onto the mullite support mentioned above. The FAU-type (Y-type herein) zeolite membrane was crystallized from a reactive gel mixture with the following molar composition: $SiO_2$: 0.04 $Al_2O_3$: 0.7 $Na_2O$: 0.1 $(TMA)_2O$: 31.5 $H_2O$ where $TMA^+$ refers to tetramethylammonium cation. A typical synthesis procedure for FAU membranes followed: NaOH pellets (99.2 wt %, Fisher) were weighted and dissolved in DI water, if applicable, followed by doping a given amount of TMAOH solution (25 wt %, Aldrich). $NaAlO_2$ powders (50-56 wt % $Al_2O_3$, 4-45 wt % $Na_2O$, technical grade, Riedel-dehaën®) were then charged into the above basic mixture. After homogenization, PS (93.9 wt % $SiO_2$, Ultrasil VN3 DWS, Evonik Degussa) was added under vigorous stirring to this solution. Stirring was continued at room temperature for 1-2 h. The resulting mixture was charged into an autoclave, into which the seeded supports were subsequently inserted vertically. The hydrothermal synthesis was conducted without stirring under autogenous pressure at 100° C. for 7 h. After crystallization was complete, the membranes were collected and washed with copious amounts of water before drying at 80° C.

Multiple variations in gel formulation ratios, crystallization times, and temperatures are possible. These can be used to tune the properties of the resulting membrane as those skilled in the art will understand. Furthermore, the mullite tube provides only one example of a support. The membrane can be grown or otherwise deposited onto any number of potential porous supports including any variety of ceramic, steel, or polymeric material.

EXAMPLE 2

Ammonia loss during $CO_2$ absorption experiments were conducted in a 1 inch ID scrubber packed with Berl ceramic saddles. Simulated flue gas consisting of 14 vol % $CO_2$, balance air, was continuously fed into the scrubber bottom with counter-current liquid flow. Experiments were conducted under liquid to gas ratio (L/G) of 100 at ambient pressure and temperature of 20° C. A 2 L volume of solution was loaded with $CO_2$ in a step fashion with the volume passed through the column into a second reservoir. After each step a solution sample was retrieved and analyzed for ammonia loss. $CO_2$ loading was continued until the difference in inlet and outlet $CO_2$ gas concentration was minimal.

Nickel chloride (Fisher, purity:>97%) with ammonia to metal mole ratio 20:1 was added to 12 wt % aqueous ammonium solution and compared to a control solution without additive. Ammonia contents were determined using Dionex ICS-3000 ion chromatograph. Compared to control, the nickel containing ammonia solution with ammonia nickel mole ratio 20:1 reduced ammonia loss by 50% over the course of the experiment.

EXAMPLE 3

Using the supported membranes described in Example 1 the membrane performance was evaluated. The evaluation apparatus was operated in a counter-current configuration with a tubular zeolite membrane sealed in a stainless steel membrane cell with Viton O-rings. A 15 ml/min constant flow dual piston pump delivered the feed solution to the membrane cell at a maximum pressure of 6.9 MPa. The feed solutions were fed from a magnetically stirred 1.5 l reservoir. Feed solution temperature in the membrane cell was controlled at a constant temperature by an adjustable heating tape. The back-pressure regulator installed at the channel outlet allowed fine control over a wide range of applied pressures within the membrane unit. A thermocouple was inserted into the cell shell side in order to accurately monitor the feed solution temperature in the membrane cell. The NF/RO experiments were run under constant operating conditions until a satisfactory steady state was reached. In the duration of the experiment, the feed and permeate samples were regularly taken to measure pH and total-carbon loadings.

This allows determination of the performance characteristics described below. Total permeation flux (J in $kg/m^2 \cdot h$) is defined as the mass of permeate produced per unit membrane area per unit time. Ion rejection rate ($R_i$) is related to the ratio of ion concentration in the permeate to that in the feed with an expression as follows: $R_i = 1 - C_{i,p}/C_{i,f}$, where $C_{i,p}$ and $C_{i,f}$ are the molarities of species i in the permeate and feed, respectively. Moreover, to quantify $NH_4OH$-permselective properties, $\Delta pH$, expressed as pH difference between the permeate and feed sides, is also determined. Commercial ammonium carbonate powders (Aldrich or Fisher) containing variable proportions of ammonium bicarbonate, ammonium carbonate and ammonium carbamate were used for the evaluation to simulate an aqueous ammonia-based $CO_2$ scrubbing solution. Table 1 shows the performance of the synthesized membrane at two selected test conditions.

TABLE 1

Separation performance of memprane prepared in Example 1.

| Membr. ID. | Temp. (° C.) | ΔP (MPa) | $C_{(total\ carbon)}$ (M) | ΔpH | Total flux ($kg/m^2 \cdot h$) | $R_{(total\ carbon)}$ (%) |
|---|---|---|---|---|---|---|
| F-1 | 60 | 2.76 | 0.15 | 1.07 | 2.97 | 92.8 |
| F-1 | 40 | 4.14 | 0.15 | 1.06 | 3.36 | 94.6 |

The foregoing description of the preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed is:

1. A method of removing and capturing carbon dioxide from a fluid stream, comprising:
    exposing the fluid stream to an aqueous scrubbing solution that removes and holds carbon dioxide from the fluid stream;
    using an aqueous solution of between about 7 and about 15 weight percent ammonia as said scrubbing solution;
    providing a transition metal catalyst capable of forming a metal ammonia complex in said scrubbing solution;
    passing said aqueous scrubbing solution through a membrane in order to separate excess water from said scrubbing solution and increase concentration of carbon dioxide in said scrubbing solution;
heating said scrubbing solution having increased concentration of carbon dioxide so as to release carbon dioxide gas;
    wherein said scrubbing solution exposed to said fluid stream is a lean solution including about 0.077 kg of carbon dioxide/kg solvent and said scrubbing solution having an increased concentration of carbon dioxide is a rich solution including about 0.177 kg of carbon dioxide/kg solvent; and
    recycling said scrubbing solution.

2. The method of claim 1, including using an aqueous solution of about 10.0 weight percent ammonia as said scrubbing solution.

3. The method of claim 2, including selecting a metal ion as said transition metal catalyst wherein said metal is selected from a group consisting of zinc, nickel, copper, cobalt and mixtures thereof.

4. The method of claim 3, including providing said transition metal catalyst at a concentration of between about 0.1 and about 2.0 weight percent.

5. The method of claim 4, including using a zeolite membrane as said membrane.

6. The method of claim 5, including selecting a zeolite from a group consisting of mordenite zeolite, phillipsite zeolite, erionite zeolite, offretite zeolite, erionite and offretite intergrowth zeolite, faujasite zeolite, chabazite zeolite and mixtures thereof for use in said membrane.

7. The method of claim 6, wherein said fluid stream is flue gas.

8. The method of claim 1, wherein said membrane is a zeolite membrane.

9. The method of claim 8, including selecting a zeolite from a group consisting of mordenite zeolite, phillipsite zeolite, erionite zeolite, offretite zeolite, erionite and offretite intergrowth zeolite, faujasite zeolite, chabazite zeolite and mixtures thereof for use in said membrane.

10. The method of claim 9, wherein said fluid stream is flue gas.

11. The method of claim 1, wherein said fluid stream is flue gas.

* * * * *